Nov. 17, 1936. A. L. NILSSON 2,060,889
BROACH
Filed July 10, 1933
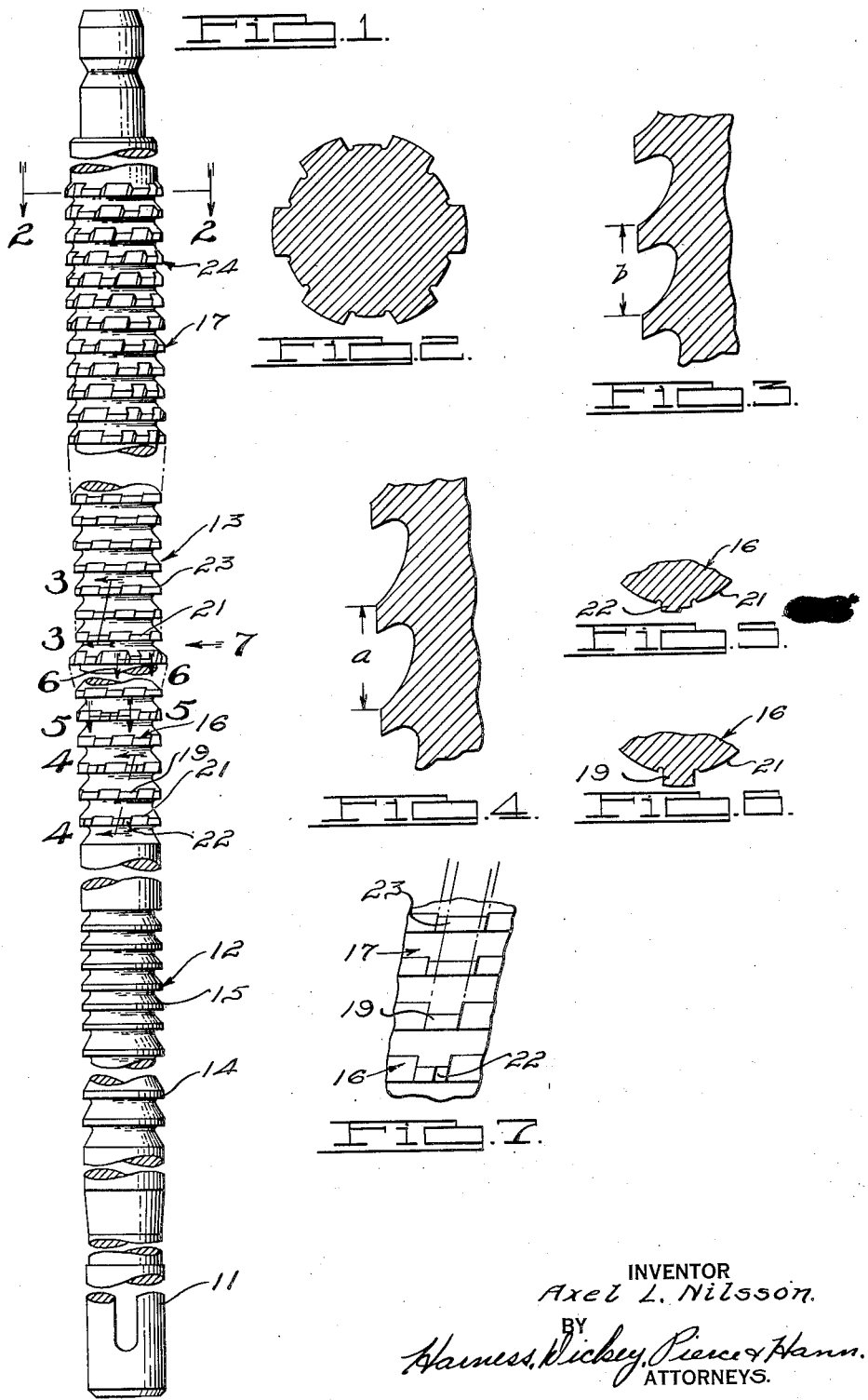
INVENTOR
Axel L. Nilsson.
BY
Harness, Dickey, Pierce & Hann.
ATTORNEYS.

Patented Nov. 17, 1936

2,060,889

UNITED STATES PATENT OFFICE 2,060,889

BROACH

Axel L. Nilsson, Detroit, Mich., assignor to Colonial Broach Company, a corporation of Michigan Application July 10, 1933, Serial No. 679,623

14 Claims. (Cl. 29—95.1)

My invention relates to broaches and particularly to a broach of the helical type employed for machining helical lands and grooves in a workpiece.

This invention is a further extension of the invention set forth and claimed in the copending application of C. J. Halborg, Serial Number 646,541, filed December 9, 1932, which has matured into patent No. 2,011,630, and is assigned to the assignee of the present invention. The present broach has two sets of helical teeth, a first set for initially cutting grooves of predetermined depth but of much narrower width than required. The second set of teeth is employed to machine the sides of the narrow grooves progressively until the groove is substantially of the desired size. The second group of teeth machine the sides a disproportionate amount, that is to say, the side of the teeth opposite that in the direction in which the broach is turning is machined a less amount than the opposite side for the purpose of providing a bearing for urging the broach in rotation.

In this type of construction, the broach may be pulled directly through the work and an accurate helical groove, following the helical lead of the teeth of the broach, will be machined in the workpiece without the requirement of turning means for the work or the broach. The broach of this construction eliminates the skidding which occurred in helical type of broaches when pulled directly through the work. As a result smooth sides are provided to the groove and no steps are found on the walls as would occur when the helical broach skids.

Accordingly, the main objects of my invention are to provide a helical broach which may be directly pulled through a workpiece to machine accurate helical grooves therein; to construct the broach in such manner as to prevent skidding; to provide two sets of teeth on the broach, the first set being of narrow width for machining a narrow groove to substantially finished depth, the second set being employed to widen the groove to a desired amount; to construct the two groups of teeth in slightly offset relation to each other so that the teeth for widening the groove will cut more from one side than the other; to stagger the teeth of the first group for the purpose of having a portion of the teeth cut grooves of less width than the teeth adjacent thereto, to effect the turning of the broach without skidding during the machining of the narrow groove; and, in general, to provide a broach of the helical type which is simple in construction, and which positively rotates on the helical angle of the row of teeth without the employment of turning means.

Other objects and features of novelty of my invention will be either specifically pointed out or will become apparent when referring, for a better understanding of my invention, to the following description taken in conjunction with the accompanying drawing, wherein:

Figure 1 is a broken view, in elevation, of a broach embodying features of my invention, Fig. 2 is an enlarged sectional view of the structure illustrated in Fig. 1, taken on the line 2—2 thereof, Fig. 3 is an enlarged sectional view of the structure illustrated in Fig. 1, taken on the line 3—3 thereof, Fig. 4 is an enlarged sectional view of the structure illustrated in Fig. 1, taken on the line 4—4 thereof, Fig. 5 is an enlarged sectional view of the structure illustrated in Fig. 1, taken on the line 5—5 thereof, Fig. 6 is an enlarged sectional view of the structure illustrated in Fig. 1, taken on the line 6—6 thereof, and Fig. 7 is an enlarged broken view of the structure illustrated in Fig. 1, taken at the point 7 of Fig. 1.

When first constructing broaches of the helical type difficulty was experienced, as pointed out hereinabove, because of the skidding of the broach which not only produced rough side walls and steps in the surface of the face and walls of the groove of the workpiece, but which also caused the groove to be on a slightly different lead from that of the tool and also caused the widening of the groove. This was substantially overcome when guiding mechanism was employed for turning the broach relative to the work or the work relative to the broach but this was not a satisfactory means of overcoming this difficulty. To have a broach successfully operate, especially a broach with not too sharp a lead angle, a pulling operation alone on the broach should be sufficient to cut a true and accurate helical groove in a workpiece. For attaining this end, I have invented the present broach which has been successfully operated to produce such accurate helical grooves in workpieces through the longitudinal pull only of the broach.

In Fig. 1, I have illustrated a broach of the spiral type, the body portion of which follows the conventional form, that is to say, having a pulling end 11, an aperture trueing portion 12 and a groove cutting portion 13. The portion 11 is provided with a plurality of roughing teeth 14 having complete or substantially complete circular cutting edges for trueing the aperture. Finishing teeth 15 of the portion 11 are similar to the roughing teeth 14 except for the spacing being considerably less in view of the small amount of material which will be removed by this set of teeth. It is to be understood that the circular cutting edges may be interrupted, preferably at staggered points for the purpose of breaking up the shavings.

The cutting portion 13 of the broach comprises two sets of teeth, one set 16 for roughing out a narrow groove and a set 17 which widens the groove to accurate dimensions. Both sets of teeth are disposed in helical rows of the same lead, the set 17 being slightly in offset relation with the set 16 as will be explained more fully hereinafter.

The group of teeth 16 comprises a plurality of cutting teeth 19 which are of narrower width than the ultimate groove to be cut in the workpiece. The teeth are provided on body portions 21 which are substantially the diameter of the aperture cutting teeth 15 and provides a bearing for the broach to prevent it from drifting sidewardly. The teeth progressively increase in diameter and are disposed in helical rows, the number of rows depending upon the number of lands and grooves to be provided in the workpiece. In the broach shown there are six rows of teeth, as illustrated more clearly in Fig. 2, which will cut six grooves in the workpiece which is to be mated with a shaft having six helical splines thereon.

The teeth 19 are of narrower width than the grooves to be ultimately cut in the workpiece as clearly illustrated in comparing the teeth 19 of group 16 with teeth 23 of group 17 in Fig. 7, wherein the first said teeth are of narrower width for the purpose of initially cutting a groove of the lead following that of the rows of teeth. To prevent the drifting of the teeth 19 when initially operating on the work, the teeth are reduced in width in staggered relation to each other. This is illustrated in Fig. 5 and Fig. 6. Tooth 22, which is the tooth illustrated in Fig. 5, has substantially half of the portion cut away on the side from which the broach turns. This arrangement eliminates the possibility of skidding by the first group of teeth when machining the groove to the width of the tooth 19 of Fig. 6. When the first body portion 21 of the section 16 of the broach enters the aperture in the workpiece the teeth 19 which alternate with the teeth 22 cut a groove the width of the teeth appearing in Fig. 6, while the teeth 22 of Fig. 5 are cutting a narrower groove. The teeth 22 more readily cut the narrow groove than the teeth 19 cut the wider groove and for this reason the narrower tooth 22 will hold the broach from skidding which may occur if all of the teeth were the width of the teeth 19.

When the next body portion 21 enters the workpiece, the teeth 19 are aligned with the teeth 22 and teeth 22 follow the teeth 19 so that the cuts made by the teeth 22 are widened by the teeth 19 which are retained on the spiral lead of the rows of teeth by the teeth 22 which are cutting a narrower groove and which will hold the broach to the proper lead angle and therefore prevent skidding of the teeth while the second body portion 21 passes therethrough. Before completely passing through the workpiece, the next adjacent body portion 21 enters the broach and in a similar manner the teeth thereof are in alternate relation to prevent skidding. A groove is provided in the workpiece which exactly follows the lead of the rows of teeth of the broach by progressively cutting the grooves of different widths during the single operation of the portion 16 therethrough.

After the last teeth 19 of the section 16 have cut the narrow grooves substantially to depth, the second section 17 widens the groove by having similar body portions 21 with wider teeth 23 thereon starting at substantially the height of the first group of teeth 19 and 21 in the section 16 under the groove or grooves. These teeth widen the groove by progressively cutting deeper as the broach is pulled longitudinally through the work and the broach is turned to follow the lead of the groove originally cut, which is that of the helical angle of the rows of teeth of the broach. To assure the turning of the broach by the teeth of the section 17, they are offset relative to the teeth 19 and 22 of the section 16, as more clearly illustrated in Fig. 7. It will be noted that the groove is widened a greater amount on the leading than the following side of the broach, that is to say, that a smaller chip is taken from the side from which the broach turns. This side will form a bearing for urging the broach to turn to follow the lead of the groove originally cut without any skidding whatsoever occurring to the broach.

In view of the reduced amount of material cut by the teeth 17, the pitch of the teeth, that is to say, their spacing may be less than the teeth of the section 16 as illustrated in Figs. 3 and 4. In Fig. 4, the pitch distance "a" is greater than the pitch distance "b" and, by taking advantage of the possibility of shortening the space between some of the teeth, the overall length of the broach is materially reduced. It is to be understood that the group of teeth 24 at the finishing end of the broach are of substantially the same size for the purpose of finally dressing the splineways to accurate predetermined dimensions.

By having the teeth of reduced width in staggered relation on the front portion of the broach, some of the teeth will be cutting shallow depths sufficient to retain the broach from turning other than on the helical lead of the teeth, during the time other of the teeth are cutting a full size groove. After the narrow groove is so cut its widening is effected in a novel manner to have the broach turned in accordance with the helical angle of the rows of teeth. This is assisted by having the teeth cut a greater amount on one side of the groove than on the other preferably on the leading side, that is to say, cutting more from the side of the splineway toward which the broach is rotating to have the opposite side from a bearing to urge the broach to so turn. In this manner the skidding which occurred heretofore is avoided. By having the pitch of the teeth so varied in conformity with the amount of material cut from the workpiece, that is to say where little material is cut the teeth are closer together, the overall length of the broach is materially reduced.

While I have described and illustrated but a single embodiment of my invention, it will be apparent to those skilled in the art that various changes, omissions, additions and substitutions may be made therein without departing from the spirit and scope of my invention as set forth in the accompanying claims.

I claim as my invention:

1. A broach for machining a helical splineway in an aperture which includes, in combination, a section for trueing the aperture to predetermined dimension, a section for machining a groove substantially to depth but of less than required width in the workpiece and a third section having teeth which widens the spline to predetermined dimensions.

2. A broach of the helical type having two sets of teeth of progressive heights disposed in aligned spiral relation longitudinally of the broach, the front set being of less width than the rear set, said rear set having its center line disposed in a spiral slightly offset from the helical center line of the teeth of the first said set.

3. A broach of the helical type having two sets of teeth of substantially the same progressive heights aligned in a row longitudinally of the broach, the front set having adjacent and alternate teeth of varied width for machining a groove to predetermined depth of less than the desired width, the teeth of the rear set being wider than the teeth of the first set for widening the groove to predetermined dimensions.

4. A broach of the spiral type having two sets of spiral teeth disposed in aligned relation longitudinally of the broach, the first set being of less width than the second set, the alternate teeth of the first set being of reduced width.

5. A broach of the helical type having a plurality of rows of teeth of like helical angle which progressively increase in height, the alternate teeth in the rows and the adjacent teeth in different rows being of reduced width, and additional teeth of like progressive increase in height but of greater width following said first teeth.

6. A broach of the helical type having a plurality of rows of teeth of like helical angle, the alternate teeth in the rows and the adjacent teeth in different rows being of reduced width, and additional teeth on the same helical angle following the first said rows but being of greater width.

7. A broach of the helical type having a row of progressive teeth arranged on a helical angle, the alternate teeth in the row being of reduced width and having a progressive increase in height, and a second group of teeth of similar progressive increase in height but of greater width aligned with the first teeth in such manner as to have the helix center line thereof offset from the helix center line of the teeth in the first said group.

8. A broach of the helical type having a plurality of rows of teeth of like helical angle, the alternate teeth in the rows and the adjacent teeth in different rows being of reduced width and having a progressive increase in height, and a second group of rows of teeth on the same helical angle and of similar progressive increase in height aligned with said first rows of teeth in such manner as to have their helix center line offset from the helix center line of the first said teeth.

9. A broach of the helical type for machining a helical groove in a workpiece provided with a section for machining the aperture of the workpiece to predetermined dimensions, of a second section having a row of teeth of predetermined helical angle and of progressive increase in height from the front to the rear thereof, and a third section similar to the second section in that they are on the same helical angle and of similar increase in height, of substantially the same range of lateral dimension, but of greater width to machine the groove to predetermined width.

10. A broach of the helical type having a group of teeth for machining the aperture to predetermined dimension, a second group provided on a predetermined helical angle having teeth of progressive height to initially machine a groove, and a third set of teeth of greater width than those of the second group likewise disposed on the helical angle but slightly offset from the center line of the first teeth to effect the turning of the broach when the wider teeth finish the groove to accurate dimensions.

11. A broach for machining a groove of predetermined width having two sets of teeth of progressive height disposed in a single row longitudinally of the broach, the teeth of the preceding set being of narrower width than those of the subsequent set with the end teeth of each set being of substantially the same height, the teeth of the subsequent set having their center line set off from the center line of the teeth of the preceding set.

12. A broach of the helical type having two sets of teeth disposed in aligned relation longitudinally of the broach with the teeth in each set progressively increasing in height from the first tooth, the first tooth in each set being substantially the same height, the front set being of less width than the rear set.

13. A broach for machining a helical groove of predetermined width having teeth of progressive height which alternately vary in width, one side of said teeth following a helical surface having the pitch of the groove to be machined.

14. A broach of the helical type having helical rows of teeth thereon, the alternate teeth of which are of reduced width, with a side of all of said teeth disposed in a helical surface.

AXEL L. NILSSON.